United States Patent [19]
Bittern

[11] 3,837,759
[45] Sept. 24, 1974

[54] HOLE SAW AND QUICK DISCONNECT DRIVE THEREFOR

[75] Inventor: Joseph E. Bittern, Weatogue, Conn.

[73] Assignee: Capewell Manufacturing Company, Hartford, Conn.

[22] Filed: July 12, 1972

[21] Appl. No.: 271,040

[52] U.S. Cl................ 408/204, 144/23, 151/16, 279/1 B, 403/118, 403/259, 403/343, 408/703
[51] Int. Cl............................................. B23b 51/04
[58] Field of Search............ 408/191, 196, 204, 209, 408/231, 232, 233, 239, 703; 145/121; 144/20, 21, 22, 23, 24; 287/53 R; 151/16, 17, 18; 279/1 B; 90/11 A; 403/343, 118, 259

[56] References Cited
UNITED STATES PATENTS

| | | | |
|---|---|---|---|
| 972,669 | 10/1910 | Wilt | 151/17 |
| 2,562,327 | 7/1951 | Moore | 287/53 R X |
| 3,138,183 | 6/1964 | Stewart | 408/231 X |

FOREIGN PATENTS OR APPLICATIONS

| | | | |
|---|---|---|---|
| 803,797 | 11/1958 | Great Britain | 90/11 A |
| 762,621 | 11/1956 | Great Britain | 90/11 A |
| 699,049 | 12/1964 | Canada | 90/11 A |

Primary Examiner—Andrew R. Juhasz
Assistant Examiner—Z. R. Bilinsky
Attorney, Agent, or Firm—Prutzman, Hayes, Kalb & Chilton

[57] ABSTRACT

A hole saw equipped with a quick disconnect drive arbor which comprises a drive shaft having a pair of axially spaced threaded sections of opposite thread direction adjacent one end of the shaft. One of the threaded sections has a substantially higher helix angle than the other threaded section with an included angle between the helices being self-releasing, or non-locking, say, about 15° or more. A quick disconnect drive ring is mounted on the higher pitch thread and is provided with a pair of depending aligning and drive pins. The hole saw is threadably mounted on the other threaded section and is provided with a pair of radially spaced apertures which cooperate with the aligning and drive pins of the drive ring. The rotation of the drive ring and hole saw in unison relative to the drive shaft causes the bottoming of the drive ring on the saw with the pins in the apertures to provide a drive connection for transmitting rotary torque therebetween. Reverse rotation of the drive ring and saw in unison relative to the drive shaft coupled with the self-releasing angle between the two threaded sections provides for the quick disconnect of the saw from the arbor.

8 Claims, 1 Drawing Figure

PATENTED SEP 24 1974    3,837,759
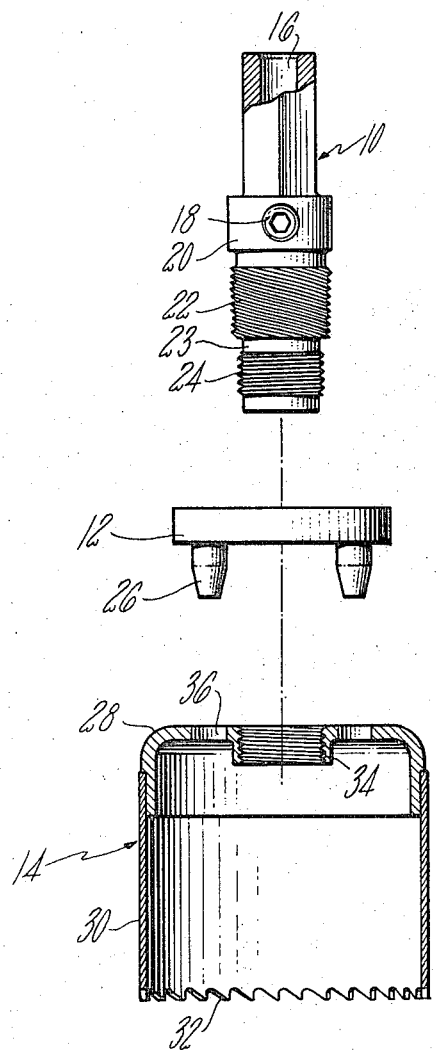

HOLE SAW AND QUICK DISCONNECT DRIVE THEREFOR

BACKGROUND AND SUMMARY OF THE INVENTION

The present invention relates generally to a hole saw and is more particularly concerned with a new and improved quick disconnect drive arbor for hole saws and the like.

An object of the present invention is to provide a new and improved hole saw equipped with a quick disconnect drive arbor capable of providng rapid assembly and disassembly of the saw from the arbor and greater stability and support for the hole saws during its operation. Another object of the present invention is to provide a new and improved drive arbor assembly for hole saws and the like providing a quick release connection. Included in this object is the provision of a drive connection for hole saws and the like which eliminates or minimizes the fretting corrosion wear which heretofore has been encountered in such drive connections.

A still further object of the present invention is to provide a new and improved quick disconnect drive assembly of the type described wherein all parts of the assembly are secured in tight driving relationship and maintained in that relationship during operation of the tool while at the same time giving greater support to the tool thereby imparting greater stability and reduced vibration.

Still another object of the present invention is to provide a new and improved hole saw arbor of the type described that includes an axially adjustable, tool-connecting drive ring capable of drivably engaging the tool during operation thereof and rapidly releasing the tool for removal. Included in this object is the provision for a hole saw arbor that eliminates the necessity for an auxiliary assembling tool.

Other objects will be in part obvious and in part pointed out in more detail hereinafter.

These and related objects are accomplished in accordance with the present invention by providing a new and improved rotary drive coupling for transmitting rotary driving motion in one rotatable direction to a hole saw or similar tool. This assembly includes a drive shaft having a pair of adjacent threaded sections of opposite thread direction and a connecting and driving ring mounted on one of said threaded sections for engagement with the hole saw during the use thereof. Quick disconnection is provided by the use of a self-releasing, or non-locking included angle between the helices of the threads, say, 15° or more to facilitate rapid axial movement of the drive ring and hole saw toward and away from each other during the assembly and disassembly of the hole saw and axially extending drive pins on the drive ring engageable with apertures in the end flange of the hole saw.

A better understanding of the objects, advantages, features, properties and relationships of the invention will be obtained from the following detailed description and the accompanying drawing which set forth an illustrative embodiment and are indicative of the way in which the principle of the invention is employed.

BRIEF DESCRIPTION OF THE DRAWING

In the drawing the sole FIGURE is an exploded elevational view, partially in section, of a hole saw and arbor assembly embodying the features of the present invention.

DESCRIPTION OF A PREFERRED EMBODIMENT

Referring now to the drawing in greater detail, the present invention, for clarity of illustration and ease of understanding the invention is shown and described as embodied in a hole saw.

The hole saw and arbor assembly of the present invention is shown in the drawing as consisting of a drive shaft 10, a drive ring 12, and a hole saw 14, the drive ring 12 and hole saw 14 being adapted for threaded mounting on the drive shaft. The shaft 10 may conveniently be provided with a bore 16 extending axially along the length thereof for receiving a suitable pilot drill which can be conveniently secured within the bore 16 by the set screw 18 or by other suitable securing means. As shown, the set screw 18 is positioned in a flange 20 shown as being integrally formed on the drive shaft 10 about midway along its length.

Adjacent the lower end of the drive shaft 10 below the shoulder 20 are a pair of adjacent threaded sections 22, 24 spaced by an unthreaded groove 23. The threaded section 22 positioned next to flange 20 is a left hand thread while the threaded section 24 is a right hand thread. The threaded section 24 is shown as being of single thread configuration while the threaded section 22 is shown as being of a multiple thread configuration, and as specifically illustrated is shown as a 1-lead left hand thread.

The quick disconnect drive ring 12 has a central threaded aperture (not shown) for mounting the ring on the left hand, multiple threaded section 22 of the shaft 10, the threaded section 24 being of reduced diameter to allow the drive ring 12 to pass thereacross. The ring 12 is of moderate thickness for stability and is provided with a pair of depending aligning and drive pins 26 affixed thereto. In the preferred embodiment, the combined thickness of the drive ring 12 and projecting length of pins 26 somewhat exceed the axial length of threaded section 22 so that the ends of the pins overlie a plane through groove 23 when the drive ring is bottomed against flange 20 to serve as a stop preventing hole saw 14 from bottoming against threaded section 22 and binding therewith.

The hole saw 14 comprises an elongated, generally cylindrical skirt portion 30 securely connected to the periphery of a cup-shaped supporting portion 28 and provided with saw teeth 32 on its free end. The cup-shaped supporting portion 28 is provided with an axially extending threaded hub 34 for mounting the saw on threaded section 24 of the shaft 10 and a pair of aligning apertures 36 radially spaced from hub 34 and adapted to cooperatively receive the aligning and drive pins 26 carried by the drive ring 12.

As will be appreciated from the foregoing description, the hole saw is easily assembled on the quick disconnect drive arbor by initially mounting the drive ring 12 on the threaded section 22 in contact with flange 20 with the ends of pins 26 in a plane perpendicular to the axis of drive shaft 10 and passing through groove 23. The hole saw is next mounted on the threaded section 24 until bottoming on the aligning and drive pins 26 of the drive ring 12. Thereafter the hole saw is backed off until the pins 26 register with the apertures 36 of the tool. Thereafter, a slight further forward rotation of the hole saw in unison with drive ring 12 will rapidly draw the drive ring into contact with the saw, say, about one-fourth turn, with an included angle of 15° between the helices of threaded sections 22 and 24 and a thread diameter of about ¾ inch for section 22.

In the preferred embodiment, the higher helix angle on threaded section 22 and the included angle between the helices of the threads of sections 22, 24 is a non-locking, or self-releasing, angle sufficient, say, 15° or more, to permit removal of the tool without the necessity of an auxiliary assembly tool, such as a key. Such an arrangement will also result in the bottoming of hole saw 14 on drive ring 12 in a plane perpendicular to the axis of shaft 20 passing through groove 23 with the hole saw 14 out of contact with threaded section 22 and its threads essentially in full threaded engagement with threaded section 24.

As will be appreciated, the direction of the opposite threaded sections and the location of the high helix angle thread can be varied depending on the end use of the quick disconnect assembly and the particular threaded section used for mounting the tool on the drive shaft.

The drive ring 12 provides a solid stabilizing support to reinforce the end wall of hole saw 14 and reduces vibration of the saw particularly when cutting metal. Moreover, the use of opposite threaded sections 22, 24 inherently produces an axial biasing force of the hole saw 14 toward the drive ring 12 due to the torque required to rotate the hole saw during use to prevent any relative movement between the threads of hole saw 14 and threaded section 24 during use. This bias increases with increased torque loading. Thus, excessive wear and fatigue breakdown, termed fretting corrosion, of the threads of hole saw 14 and threaded section 24 due to high frequency high stress vibrational separation of contacting surfaces of minute amplitude imposed on the threads as a result of tool vibration are eliminated or minimized because the axial force imposed between the threads to prevent fretting corrosion increases with the forces cause tool vibrations which cause the fretting corrosion.

To remove the hole saw 14 from the arbor, all that is necessary is to rotate the hole saw in the same direction it travels during use while holding the shaft 10 stationary. This causes the ring 12 to move axially toward the flange 20 along the multiple thread to effect rapid axial separation between the hole saw and the drive ring thereby quickly releasing the hole saw from its secured working position. Simultaneously, the saw 14 moves outwardly under the cooperative driving engagement of the connecting pins with the aligning apertures. As soon as the aligning pins clear the apertures, the hole saw can be rotatably removed from the threaded section 24 of the arbor. Thus, the assembly provides a simple and rapid manner of connecting and disconnecting a rotary tool while providing additional stability during the operation thereof.

As will be apparent to persons skilled in the art, various modifications, adaptations, and variations of the foregoing specific disclosure can be made without departing from the teachings of the present invention.

I claim:

1. A hole saw assembly equipped with a quick disconnect rotatable drive arbor including a drive shaft having first and second axially spaced threaded sections of opposite thread direction, the included angle between the helices of the threaded sections being a non-locking angle, a drive ring threadably mounted on one of said threaded sections and a hole saw threadably mounted on the other of said threaded sections, said drive ring and said saw each having interengaging interlock and drive means respectively fixed thereon, said interlock and drive means cooperatively engaging each other for effecting their simultaneous rotation relative to said drive shaft to cause converging and diverging movement of said ring and said saw and said cooperating interlock and drive means axially along said shaft during the assembly and disassembly of the saw on the drive shaft, respectively.

2. The hole saw assembly of claim 1 wherein said one threaded section is of multiple thread configuration and the threads thereof have a higher helix angle than the threads of said other threaded section.

3. The hole saw assembly of claim 1 wherein said included angle is about 15° or more.

4. The hole saw assembly of claim 3 wherein the drive shaft is provided with a reduced diameter portion adjacent one end thereof and said other threaded section is of single thread configuration cut into said reduced diameter portion.

5. The hole saw assembly of claim 1 wherein said cooperative interlock and drive means comprises axially extending pin means on one of said drive ring and hole saw and mating aperture means on the other of said drive ring and hole saw to effect a torque transmitting drive connection therebetween.

6. The hole saw assembly of claim 5 wherein said drive ring bottoms axially on said hole saw when assembled and transmits an axial biasing force hereon proportional to the torque transmitted therebetween.

7. The hole saw assembly of claim 1 wherein said cooperative interlock and drive means comprises a pair of apertures in said hole saw and a pair of mating pins affixed to said drive ring to transmit torque therebetween during rotation of said drive shaft during use of the saw.

8. The hole saw assembly of claim 7 wherein said threaded sections are spaced by a groove, a stop is provided on said drive shaft and the end of said pins lie in a plane perpendicular to the axis of said shaft beyond the end of said other of said threaded sections when said drive ring engages said stop.

* * * * *

UNITED STATES PATENT OFFICE
CERTIFICATE OF CORRECTION

Patent No. 3,837,759                    Dated September 24, 1974

Inventor(s) Joseph E. Bittern

It is certified that error appears in the above-identified patent and that said Letters Patent are hereby corrected as shown below:

Column 1, line 13, cancel "providng" and substitute therefor --providing--.

Column 2, line 34, cancel "1" and substitute therefor --ten--.

Column 3, line 18, cancel "20" and substitute therefor --10--.

Signed and sealed this 26th day of November 1974.

(SEAL)
Attest:

McCOY M. GIBSON JR.                    C. MARSHALL DANN
Attesting Officer                      Commissioner of Patents